US007672124B2

(12) United States Patent
Zhang et al.

(10) Patent No.: US 7,672,124 B2
(45) Date of Patent: Mar. 2, 2010

(54) COMPUTER CASE WITH LOCKING SIDE PANEL AND BEZEL

(75) Inventors: Jie Zhang, Shenzhen (CN); Xiao-Yong Qin, Shenzhen (CN); Hung-Chun Lu, Taipei Hsien (TW); Wen-Kang Lo, Taipei Hsien (TW); Guang-Yao Lee, Taipei Hsien (TW); Chun-Chi Liang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 120 days.

(21) Appl. No.: 11/953,860

(22) Filed: Dec. 11, 2007

(65) Prior Publication Data
US 2008/0225475 A1 Sep. 18, 2008

(30) Foreign Application Priority Data
Mar. 12, 2007 (CN) .......................... 2007 1 0200264

(51) Int. Cl.
*H05K 5/00* (2006.01)
*H05K 7/00* (2006.01)

(52) U.S. Cl. ............................ 361/679.58; 361/679.57; 361/679.6

(58) Field of Classification Search ............ 361/679.58, 361/679.6, 679.57; 312/223.2
See application file for complete search history.

(56) References Cited

U.S. PATENT DOCUMENTS

| | | | | |
|---|---|---|---|---|
| 6,700,776 B2* | 3/2004 | Bang et al. | ............. | 361/679.58 |
| 6,899,407 B1* | 5/2005 | Lai | ............. | 312/223.2 |
| 6,906,927 B2* | 6/2005 | Su | ............. | 361/727 |
| 7,082,036 B2* | 7/2006 | Cheng et al. | ............. | 361/726 |
| 2005/0040740 A1* | 2/2005 | Yun | ............. | 312/223.2 |

* cited by examiner

Primary Examiner—Jayprakash N Gandhi
Assistant Examiner—Anthony M Haughton
(74) Attorney, Agent, or Firm—Frank R. Niranjan

(57) ABSTRACT

A computer case includes a chassis comprising a first wall and a second wall detachably attached to the first wall, a cover detachably attached to the first wall, and means for coupling the cover to the first wall. The coupling means is driven by the second wall to fix the cover to the first wall and prevent the cover from being detached from the first wall before the second wall disengaged from the first wall.

15 Claims, 12 Drawing Sheets

COMPUTER CASE WITH LOCKING SIDE PANEL AND BEZEL

BACKGROUND

1. Field of the Invention

The present invention relates to computer cases, and more particularly to a computer case with locking side panel and bezel.

2. Description of Related Art

Nowadays, computers have become increasingly popular for general use, which make it more and more important to prevent expensive components such as CPUs, hard disk drives or memory modules in the computer case from being stolen, so that locking computer cases have appeared.

Ordinarily, access to the inside of a computer case is through a side panel or a top panel. A lock is connected between the chassis and the side panel or top panel to prevent the computer case from being opened by unauthorized persons. However, control of access through a front bezel of the computer case is often neglected, so that the front bezel may be dismantled.

What is desired, therefore, is a computer case with locking side panel and bezel thereof.

SUMMARY

An exemplary computer case includes a chassis, a bezel, and a spring-loaded first locking member. The chassis includes a side panel and a front wall. The side panel can be disassembled from the chassis and includes an urging piece extending therefrom. The bezel is mounted to the front wall and includes at least one claw extending therefrom. The first locking member is slidably mounted to the front wall and can be urged by the urging piece of the side panel. The first locking member includes at least one hooking part corresponding to the at least one claw of the bezel. When the side panel is assembled to the chassis, the first locking member is urged by the urging piece of the side panel to slide relative to the front wall to make the at least one hooking part thereof be caught by the at least one claw of the bezel, and when the side panel is disassembled from the chassis, the urging piece of the side panel disengages from the first locking member, the first locking member restoringly slides to disengage the at least one hooking part thereof from the at least one claw of the bezel.

Other advantages and novel features will become more apparent from the following detailed description when taken in conjunction with the accompanying drawings, in which:

DETAILED DESCRIPTION

Figure 1:
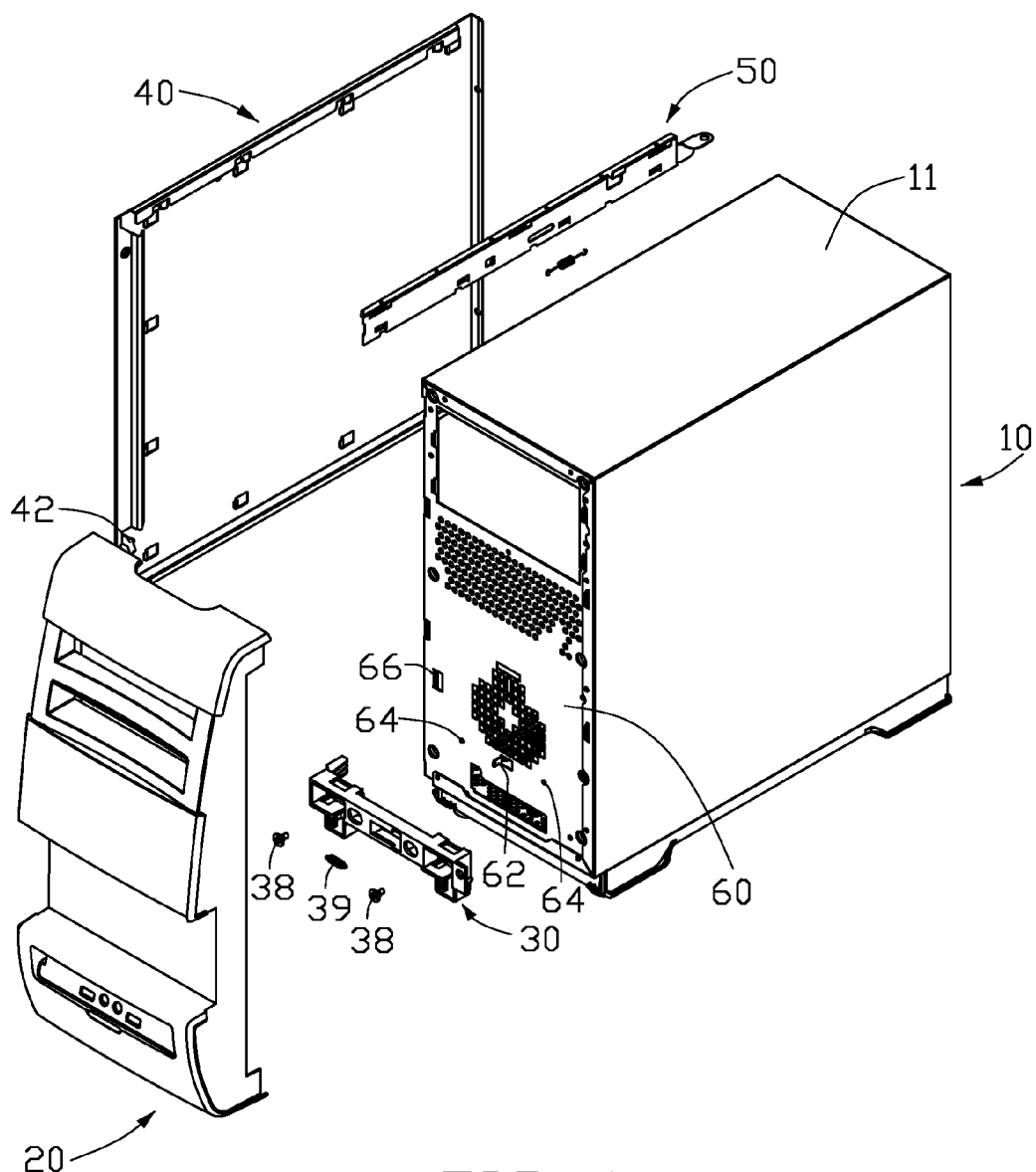
FIG. 1 is an exploded, isometric view of a computer case in accordance with an embodiment of the present invention, the computer case including a bezel, a first locking member, a chassis, a second locking member, and a side panel.

Referring to FIG. 1, a computer case in accordance with an embodiment of the present invention includes a chassis 10, a bezel or cover 20 mounted to the front of the chassis 10, a first locking member 30, a left side panel 40 mounted to the chassis 10, and a second locking member 50.

Figure 2:
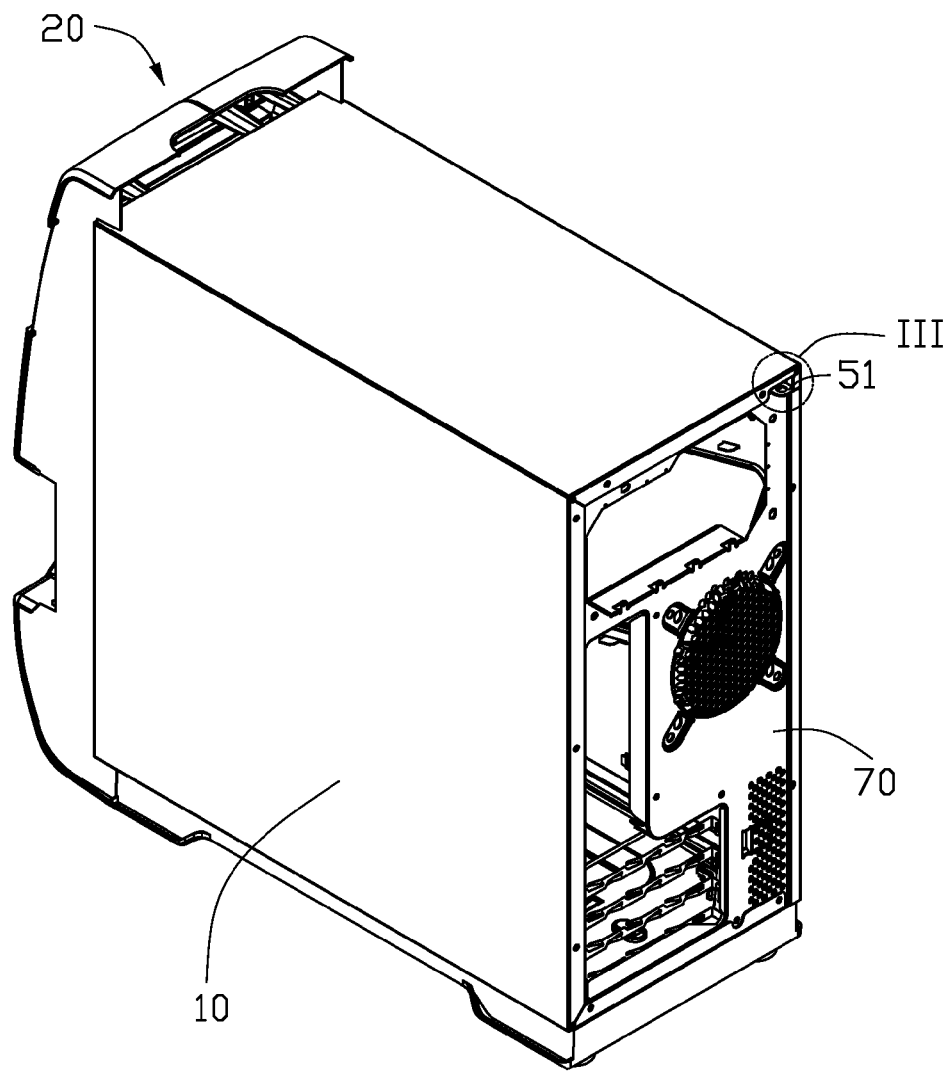
FIG. 2 is an assembled view of FIG. 1, but viewed from another aspect.
Figure 3:
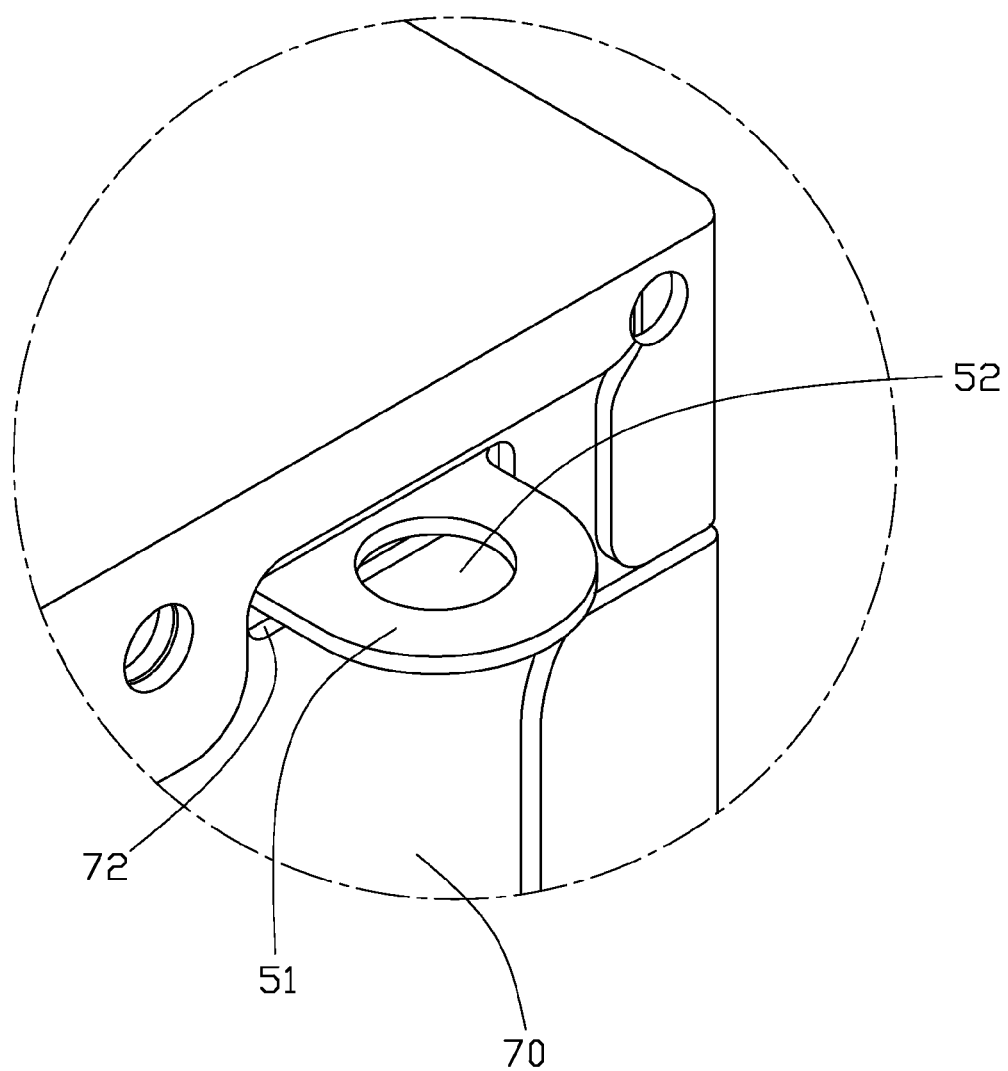
FIG. 3 is a enlarge view of a circled portion III of FIG. 1.
Figure 8:
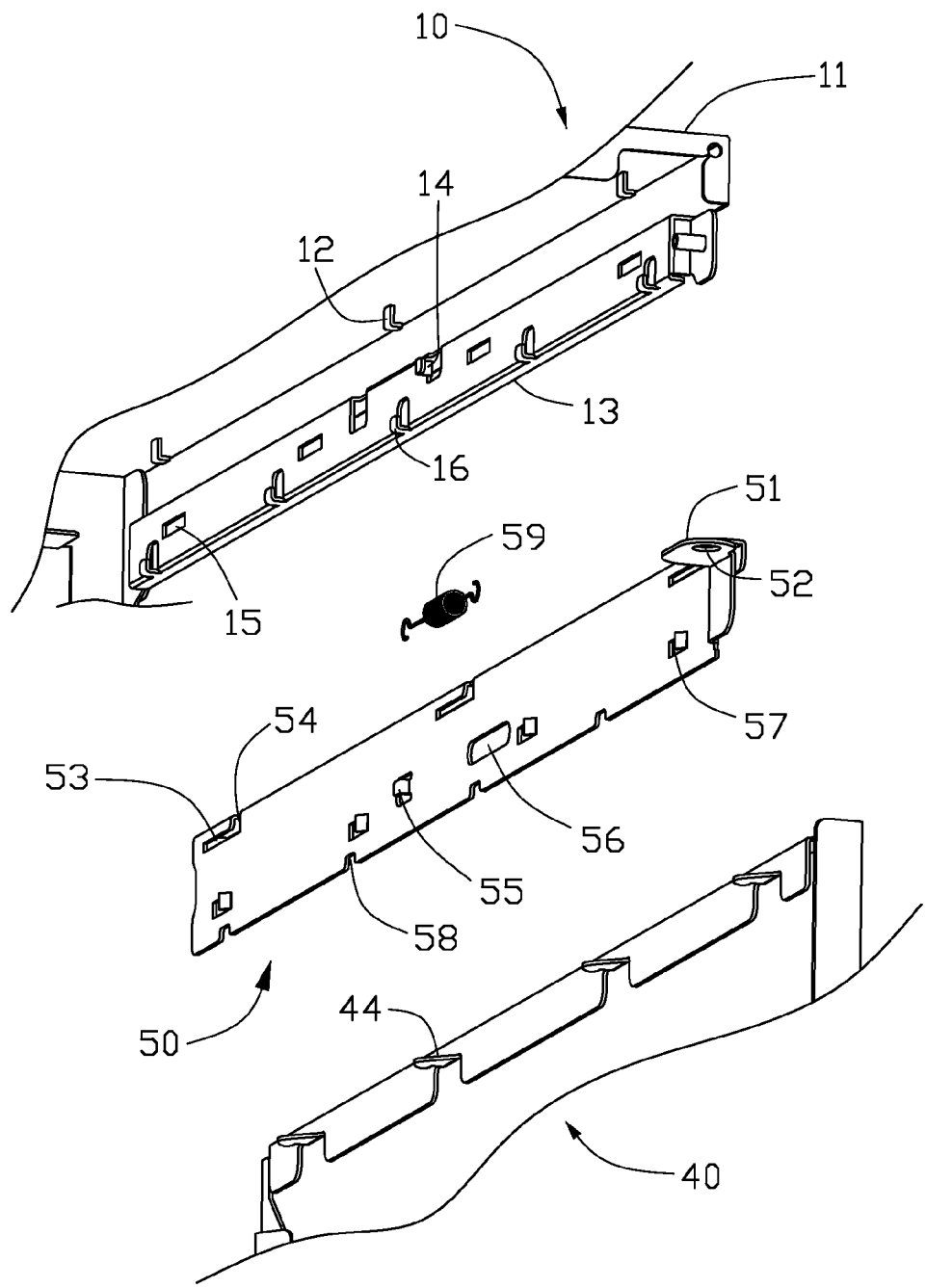
FIG. 8 is an enlarged, exploded, isometric view of part of the chassis, the second locking member and the side panel of FIG. 7.
Figure 9:
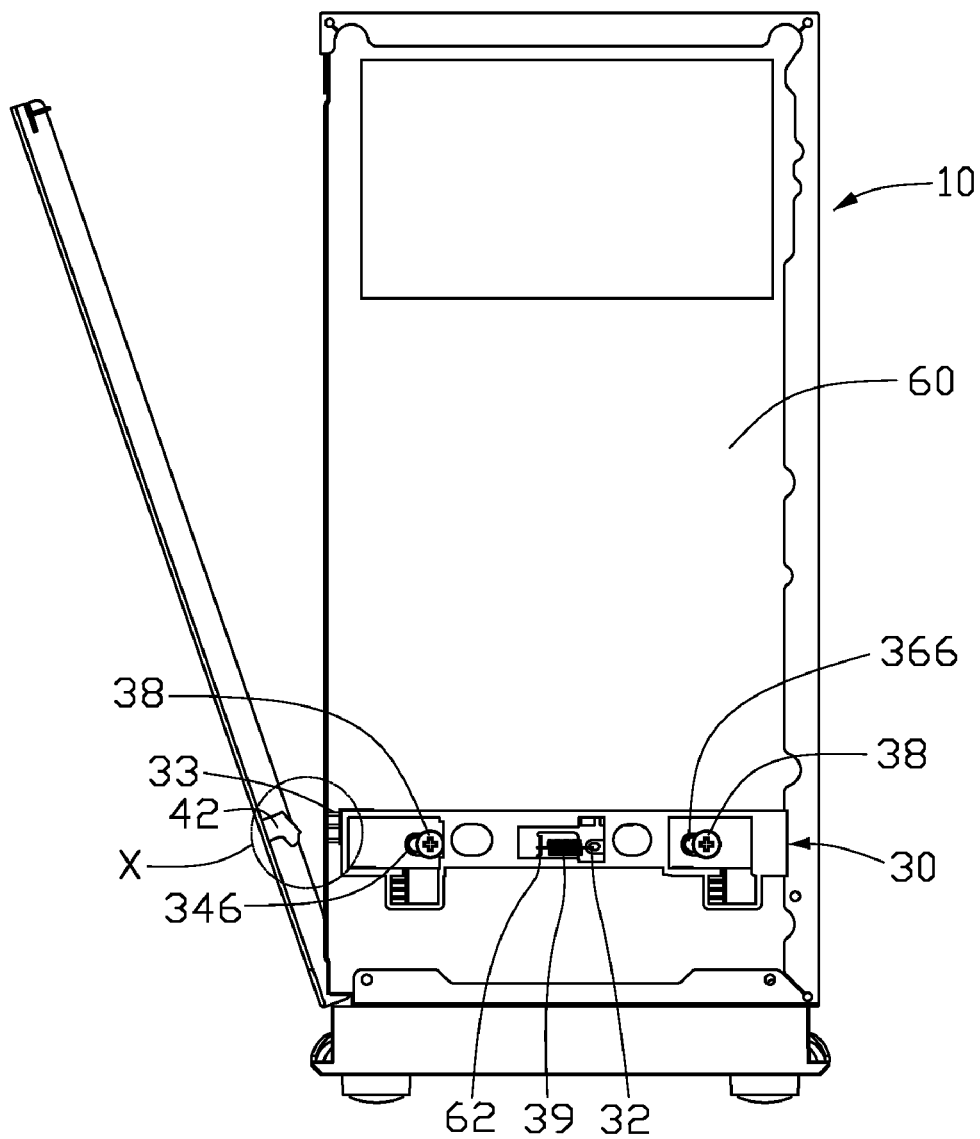
FIG. 9 is front elevation view of the computer case without the bezel of FIG. 1, showing the computer case in a first state.
Figure 10:
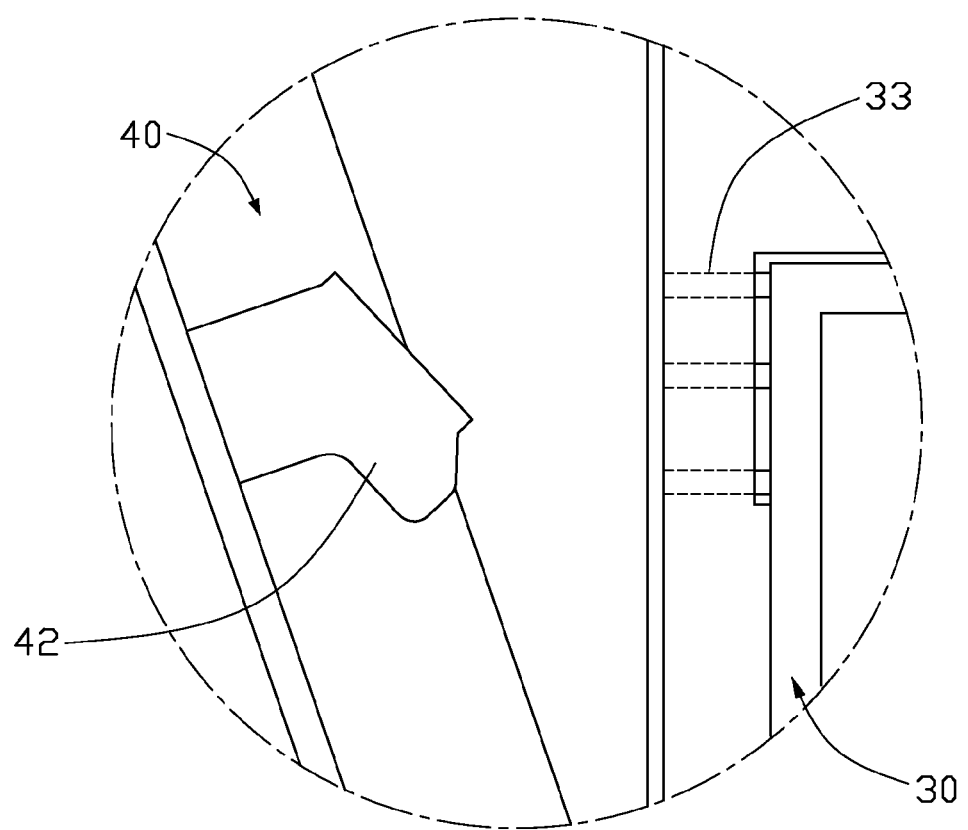
FIG. 10 is an enlarge view of a circled portion X of FIG. 9.
Figure 11:
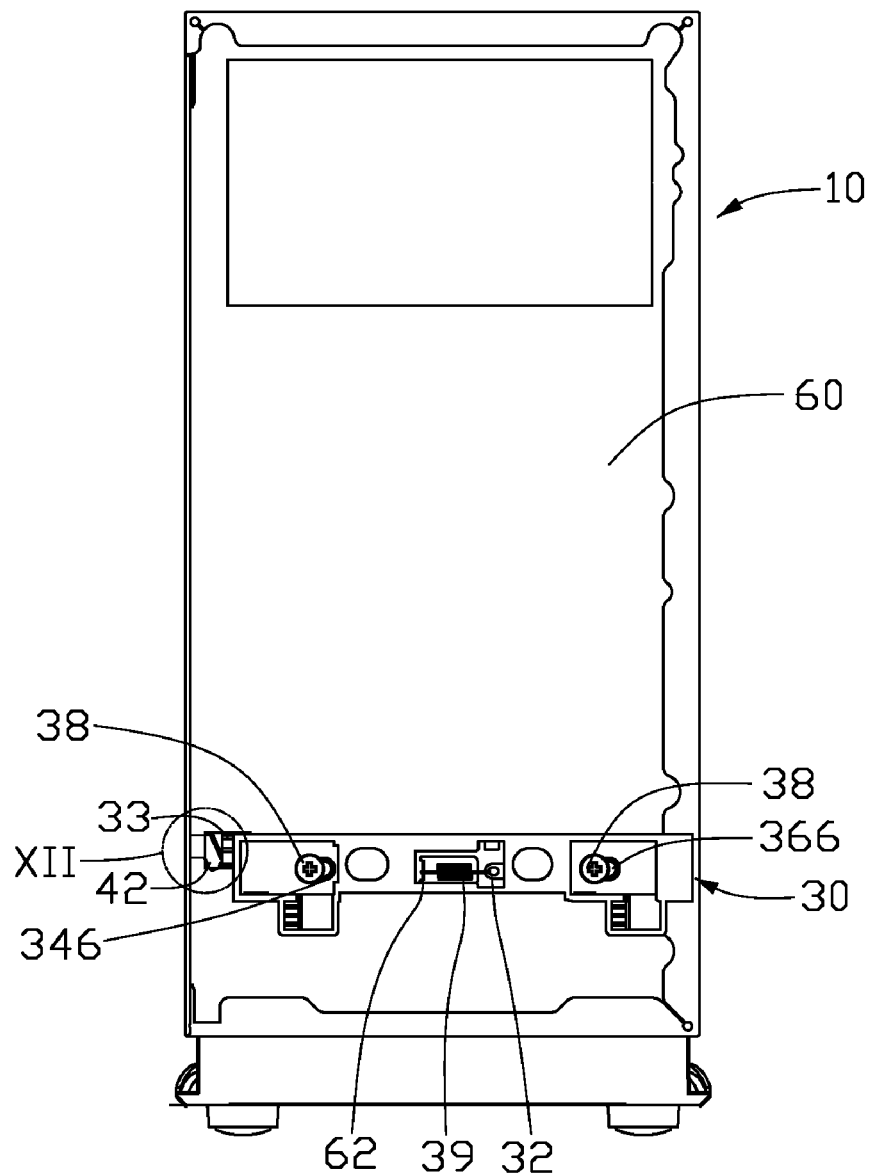
FIG. 11 is front elevation view of the computer case without the bezel of FIG. 1, showing the computer case in a second state.
Figure 12:
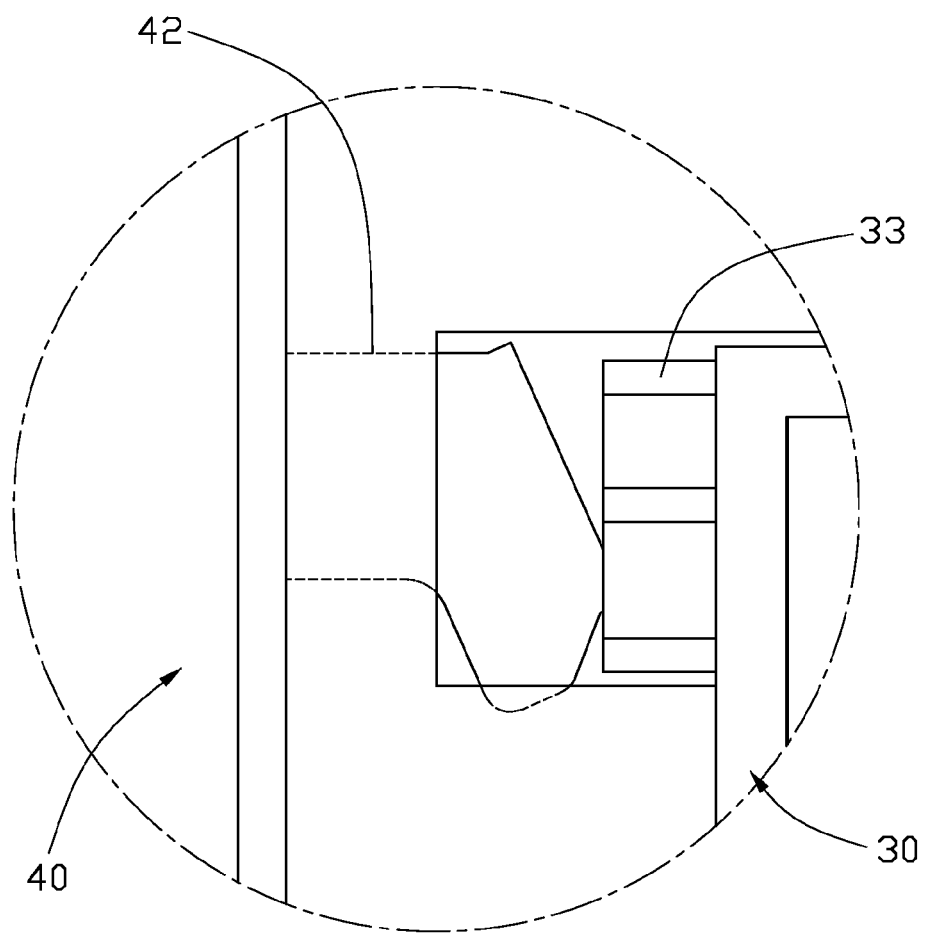
FIG. 12 is an enlarge view of a circled portion XII of FIG. 11.

Referring also to FIGS. 2 and 3, the chassis 10 includes a front wall 60, a rear wall 70, and a top wall 11. A rectangular hooking piece 62 extends forward from the front wall 60, and a hole is defined in the hooking piece 62. Two screw holes 64 are defined in the front wall 60, one of the screw holes 64 is located at the left side of the hooking piece 62 and the other one is located at the right side of the hooking piece 62. A square orifice 66 is defined in the front wall 60 adjacent a left-side edge thereof higher than the screw hole 64. A slot 72 is horizontally defined in a top right corner of the rear wall 70. Referring also to FIG. 8, the top wall 11 includes three aligned L-shaped hooks 12 extending from an inner surface thereof, and an elongated bent part 13 extending downward from a right edge thereof. A hook 14 extends from an inner surface of a middle portion of the bent part 13. Four rectangular orifices 15 are defined along a horizontal line in the bent part 13. A plurality of L-shape carrying juts 16 extends from a lower edge of the bent part 13 to the inside of the computer case.

Figure 4:
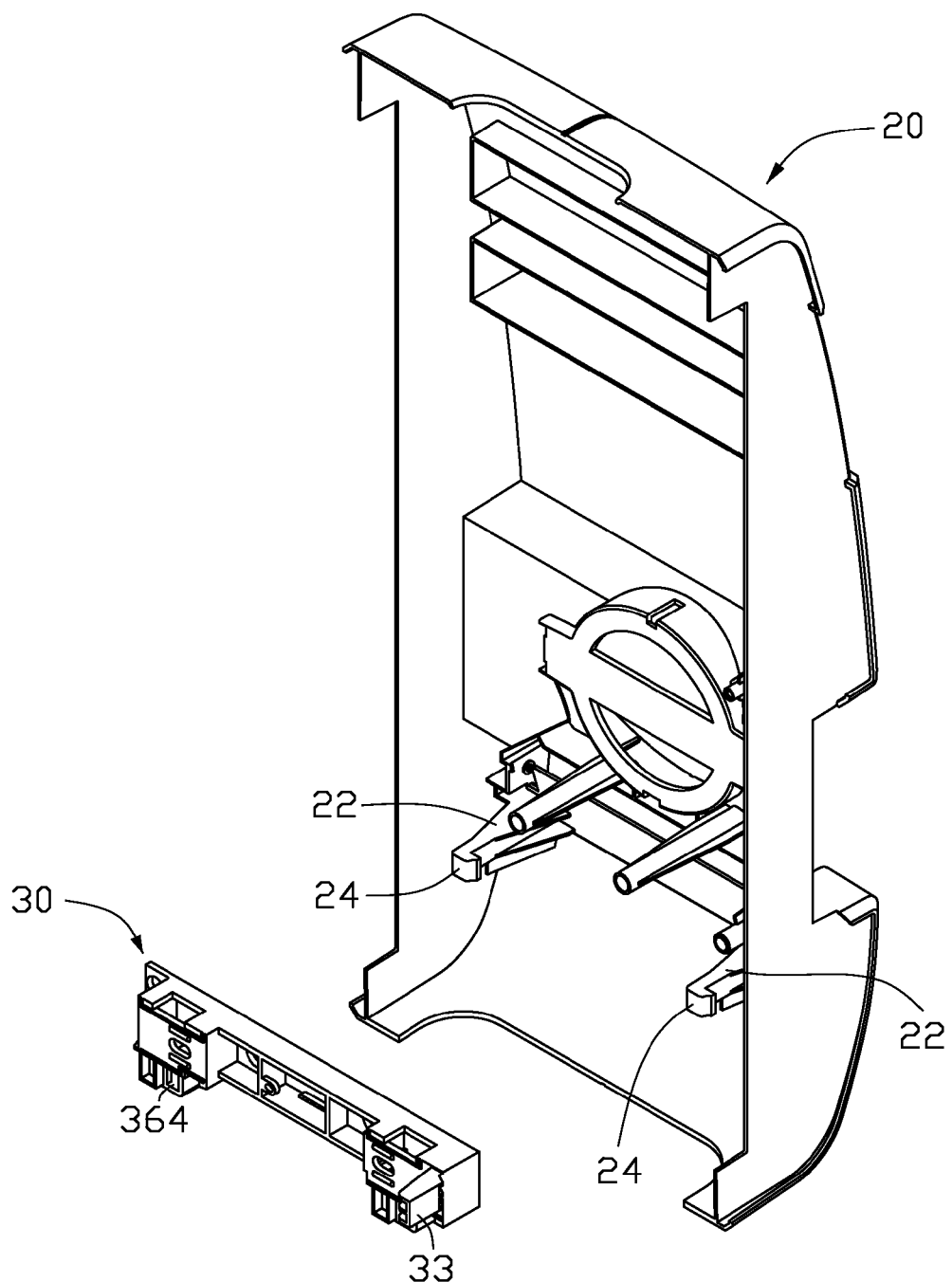
FIG. 4 is an enlarged, isometric view of the bezel and the first locking member of FIG. 1, but viewed from a third aspect.

Referring also to FIG. 4, the bezel 20 includes two poles 22 extending backward from a lower portion thereof. A claw 24 extends towards the right side of the bezel 20 from a free end of each pole 22.

Figure 5:
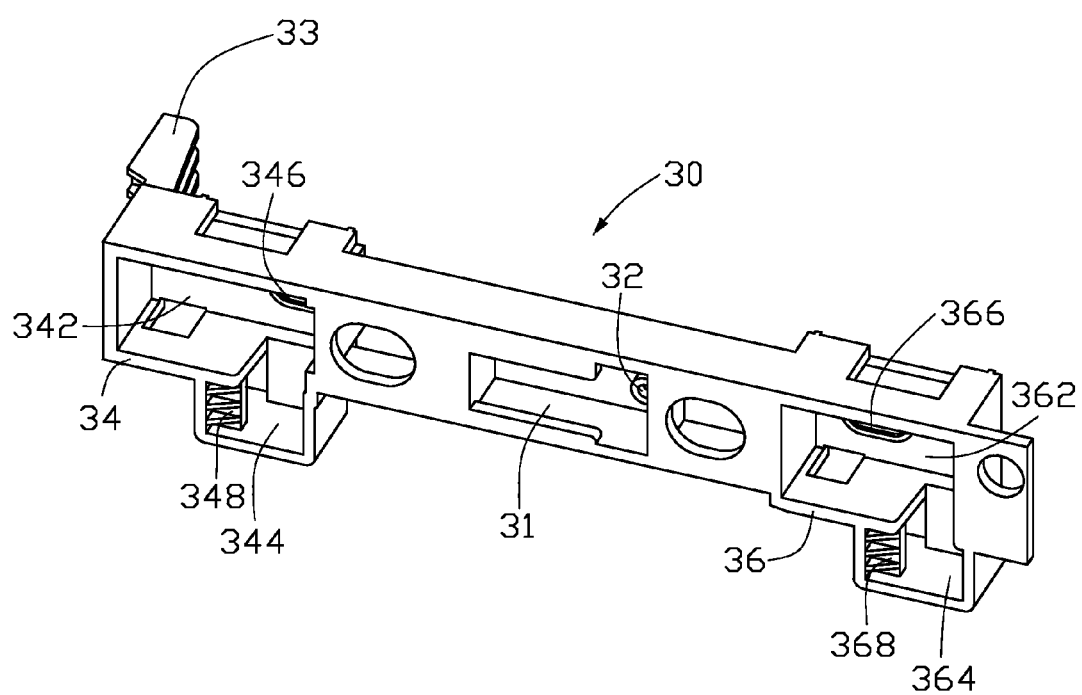
FIGS. 5 and 6 are enlarged, isometric views of the first locking member of FIG. 1 viewed from different aspects.
Figure 6:
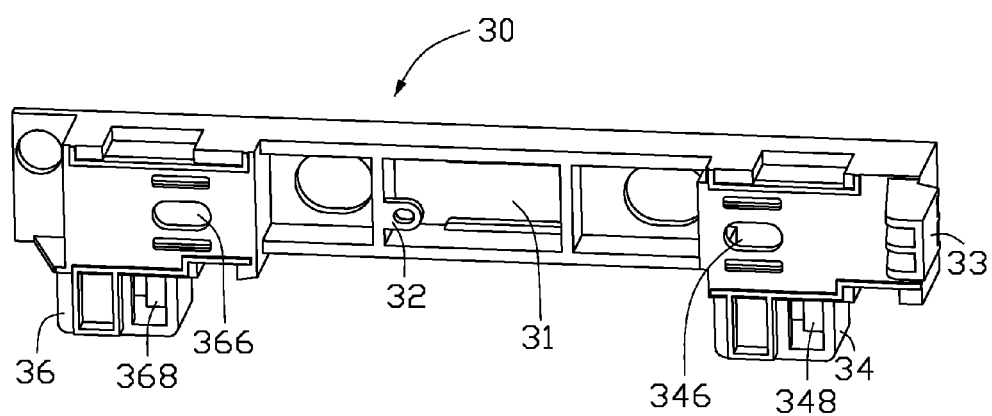

Referring also to FIGS. 5 and 6, the first locking member 30 is bar-shaped. A groove 31 is defined in a middle portion of the first locking member 30, and a hooking piece 32 defining a hole therein extends from an inner right wall (as seen in FIG. 5) bounding the groove 31. A block 33 extends backward from a left end of the first locking member 30. A recessed section 34 is defined in a left portion of the first locking member 30. The recessed section 34 includes a big upper cavity 342 and a small lower cavity 344 communicating with the cavity 342. A sliding groove 346 is defined in a back wall of the cavity 342. A catching piece 348 projects from an inner left wall of the cavity 344, which forms a hooking part corresponding to one of the claws 24 of the bezel 20.

A recessed portion 36 is defined in a right portion of the first locking member 30 (as seen in FIG. 5). The recessed section 34 includes a big upper cavity 362 and a small lower cavity 364 communicating with the cavity 362. A sliding groove 366 is defined in a back wall of the cavity 362. A catching piece 368 projects from an inner left wall of the cavity 364, which forms a hooking part corresponding to another one of the claws 24 of the bezel 20.

Figure 7:
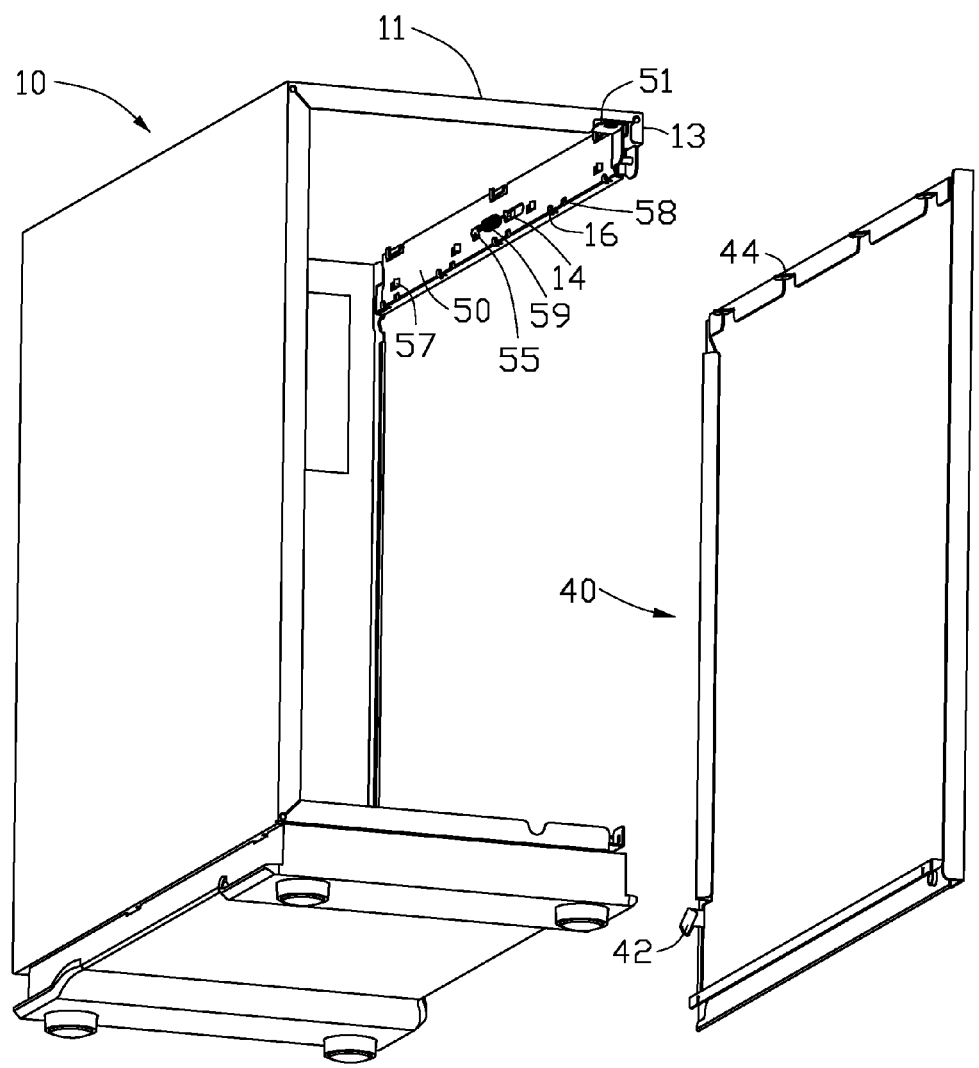
FIG. 7 is an exploded, isometric view of the chassis without a rear wall coupling with the second locking member and the side panel of FIG. 1, but viewed from a fourth aspect.

Referring also to FIG. 7, the side panel 40 includes an urging piece 42 extending to the inside of the computer case from a front edge thereof, and four horizontally aligned L-shaped hooks 44 extending from an inner side near an upper edge thereof, corresponding to the four rectangular orifices 15 of the bent part 13 of the chassis 10.

Referring also to FIG. 8, the second locking member 50 is an elongated piece. A locking piece 51 with a locking hole 52 defined therein extends from a rear end of the second locking member 50. Three sliding slots 53 corresponding to the three hooks 12 of the top wall 11 of the chassis 10 are defined near an upper edge of the second locking member 50. A guiding slot 54 communicating with each sliding slot 53 is vertically defined at the upper edge of the second locking member 50. A hook 55 extends from an inner side of the middle portion of the second locking member 50, and an orifice 56 is defined near the hook 55. Four square orifices 57 corresponding to the four rectangular orifices 15 are defined near a lower edge of the second locking member 50.

Referring also to FIGS. 9 to 12, in assembly, the block 33 of the first locking member 30 is inserted through the square orifice 66 of the front wall 60 of the chassis 60, the hooking piece 62 of the front wall 60 is inserted in the groove 31 of the first locking member 30, and two screws 38 are respectively inserted through the sliding groove 346, 366 of the first locking member 30 and engaged in the screw holes 64 of the front wall 60, so that the first locking member 30 is slidably mounted to the front wall 60 of the chassis 10. Two opposite ends of a spring 39 respectively catch the hooking piece 32 of the first locking member 30 and the hooking piece 62 of the front wall 60, so that the first locking member 30 is restricted by the spring 39 when sliding relative to the front wall 60. The bezel 20 is mounted to the chassis 10, and the claws 24 of the poles 22 of the bezel are received in the corresponding cavities 344, 346 of the first locking member 30 and catch the corresponding catching pieces 348, 368 in the cavities 344, 364.

Referring back to FIGS. 7 and 8, the hook 14 of the bent part 13 of the chassis 10 is inserted through the orifice 56 of the second locking member 50, the hooks 12 of the top wall 11 of the chassis 10 are guided by and slid along the corresponding guiding slots 54 of the second locking member 50 and then slidably engaged in the corresponding sliding slots 53, the locking piece 51 of the second locking member 50 is inserted through the slot 72 of the rear wall 70 of the chassis 10 (see FIGS. 2 and 3), and the second locking member 50 is supported on the carrying juts 16 of the bent part 13 of the chassis 10 and located between the carrying juts 16 and the chassis 10, so that the second locking member 50 is slidably mounted to the chassis 10, and at any position of the second locking member 50 in its sliding range, each square orifice 57 always overlaps the corresponding rectangular orifice 15 of the bent part 13. To allow the bottom edge of the second locking member 50 to clear the carrying juts 16 in assembly when it is fit to the bent part 13, a plurality of indentations 58 corresponding to the carrying juts 16 of the bent part 13 is defined in the lower edge of the second locking member 50. Two opposite ends of a spring 59 respectively catch the hook 55 of the second locking member 50 and the hook 14 of the bent part 13 of the chassis 10, so that the second locking member 50 is restricted by the spring 39 when sliding relative to the chassis 10. The side panel 40 is mounted to the chassis 10, and the hooks 44 of the side panel 40 are in turn inserted through the corresponding rectangular orifices 15 of the bent part 13 of the chassis 10 and the corresponding square orifices 57 of the second locking member 50, thereby the urging piece 42 urges against the block 33 thereby sliding the first locking member 30 along its path.

In use, a lock (not shown) is used to lock the locking piece 51 of the second locking member 50, and because of the force of the spring 59, the hooks 44 of the side panel 40 catch a wall of the second locking member 50 bounding the square orifices 57 in a normal state, so that the side panel 40 can't be disassembled from the chassis 10. Referring to FIGS. 9 to 12, in assembling the side panel 40 to the chassis 10, the urging piece 42 of the side panel 40 pushes the block 33 of the first locking member 30, thus urging the first locking member 30 to slide to a right side of front wall 60 of the chassis 10 and the spring 39 is stretched, so that the claws 24 of the bezel 20 may catch the corresponding catching pieces 348, 368 in the cavities 344, 346 of the first locking member 30. Thus, locking the bezel to the chassis 10. In disassembly, the lock is detached from the locking piece 51 of the second locking member 50. The locking piece 51 is pushed to make the second locking member 50 slide forward until the hooks 44 of the side panel 40 disengage from the wall of the second locking member 50. The hooks 44 of the side panel 40 are in turn drawn out from the corresponding square orifices 57 of the second locking member 50 and the corresponding rectangular orifices 15 of the bent part 13 of the chassis 10, so that the side panel 40 can be disassembled from the chassis 10. Thus, the urging piece 42 of the side panel 40 disengages from the block 33 of the first locking member 30, the spring 39 is restored to drive the first locking member 30 to slide to a left side of front wall 60 of the chassis 10, the claws 24 of the bezel 20 disengage from the corresponding catching pieces 348, 368 in the cavities 344, 346 of the first locking member 30, so that the bezel 20 can be disassembled from the chassis 10.

Thus, the wealth components in the chassis 10 are safeguarded by preventing unauthorized disassembly of both the side panel 40 and the bezel 20.

It is believed that the present embodiment and its advantage will be understood from the foregoing description, and it will be apparent that various changes may be made thereto without departing from the spirit and scope of the invention or sacrificing all of its material advantages, the example hereinbefore described merely being an exemplary embodiment of the invention.

What is claimed is:

1. A computer case comprising:
    a chassis comprising a side panel and a front wall, wherein the side panel capable of being disassembled from the chassis comprises an urging piece extending therefrom;
    a bezel mounted to the front wall, comprising at least one claw extending therefrom; and
    a spring-loaded first locking member slidably mounted to the front wall and capable of being urged by the urging piece of the side panel, comprising at least one hooking part corresponding to the at least one claw of the bezel, wherein when the side panel is assembled to the chassis, the first locking member is urged by the urging piece of the side panel to slide relative to the front wall to make the at least one hooking part thereof be caught by the at least one claw of the bezel, and only when the side panel is disassembled from the chassis, the urging piece of the side panel disengages from the first locking member, the first locking member restoringly slides to disengage the at least one hooking part thereof from the at least one claw of the bezel.

2. The computer case as claimed in claim 1, wherein two sliding grooves are defined in the first locking member, two screw hole corresponding to the two sliding grooves are defined in the front wall of the chassis, two screws are respectively inserted through the two sliding grooves and engaged in the two screw holes, so that the first locking member is slidably mounted to the front wall.

3. The computer case as claimed in claim 1, wherein the first locking member comprises a hooking piece extending therefrom, the front wall of the chassis comprises a hooking piece extending therefrom, two opposite ends of a spring respectively catch the hooking piece of the first locking member and the hooking piece of the front wall, so that the first locking member is restricted by the spring when sliding relative to the front wall.

4. The computer case as claimed in claim 1, wherein the hooking part of the first locking member comprises a cavity defined in the first locking member and a catching piece projecting from an inner wall of the cavity, the claw of the bezel is capable of inserting in the cavity and catching the catching piece.

5. The computer case as claimed in claim 1, wherein the computer case further comprises a second locking member, the chassis comprises a bent part extending therefrom, the second locking member is slidably mounted on the inner side of the bent part under elastic restraint, the side panel comprises at least one hook extending therefrom, at least one orifice is defined in the bent part, at least one orifice is defined in the second locking member, the at least one hook of the side panel is capable of being inserted through the at least one orifice of the bent part and the at least one orifice of the second locking member and catching a wall of the second locking member when the second locking member is slid to a locking position, the at least one hook of the side panel is capable of disengaging from the second locking member and the bent part and disassembling from the chassis when the second locking member is slid to an unlocking position.

6. The computer case as claimed in claim 5, wherein the at least one orifice of the bent part is bigger than the at least one orifice of the second locking member, and no matter the second locking member slides or not, a projection that the at least one orifice of the second locking member project on the bent part always locates in an area of the at least one orifice of the bent part.

7. The computer case as claimed in claim 6, wherein the second locking member comprises a locking piece extend therefrom, the chassis comprises a back wall defining a slot therein, the locking piece of the second locking member is inserted though the slot of the back wall and extended outside the chassis, the locking piece is capable of being operated to make the second locking member slide relative to the bent part of the chassis.

8. The computer case as claimed in claim 6, wherein a locking hole is defined in the locking piece of the second locking member, the computer case further comprises a lock capable of locking the locking piece via the locking hole.

9. The computer case as claimed in claim 6, wherein the bent part of the chassis comprises a plurality of L-shape carrying juts extending from a lower edge thereof, the second locking member is slidably supported on the L-shape carrying juts.

10. The computer case as claimed in claim 6, wherein the top wall of the chassis comprises a plurality of L-shaped hooks extending down from an inner surface thereof, a plurality of sliding slots corresponding to the L-shaped hooks is defined near an upper edge of the second locking member, the L-shaped hooks slidably engage in the corresponding sliding slots.

11. The computer case as claimed in claim 10, wherein a guiding slot communicating with each of the sliding slot is vertically defined at the upper edge of the second locking member, each of the L-shaped hooks of the top wall of the chassis can engage in or disengage from the corresponding sliding slot via the corresponding guiding slot.

12. A computer case comprising:
a chassis comprising a first wall and a second wall detachably attached to the first wall;
a cover detachably attached to the first wall; and
means for coupling the cover to the first wall, the coupling means being driven by the second wall to fix the cover to the first wall and preventing the cover from being detached from the first wall before the second wall disengaged from the first wall, wherein when the second wall is disengaged from first wall, the disengagement of the second wall directly causes the fixation between the cover and the first wall to be released.

13. The computer case as claimed in claim 12, wherein the coupling means comprises a first locking member slidably mounted to the first wall, and a claw disposed on the cover configured to engage with the first locking member.

14. The computer case as claimed in claim 13, wherein the computer case farther comprises a third wall fixed to the first wall, and a second locking member slidably mounted to the third wall configured to fix the second wall to the first wall and prevent the second wall from being detached from the first wall.

15. A computer case comprising:
a chassis comprising a first wall, a second wall detachably attached to the first wall, and a third wall fixed to the first wall;
a cover detachably attached to the first wall;
means for coupling the cover to the first wall, the coupling means being driven by the second wall to fix the cover to the first wall and preventing the cover from being detached from the first wall before the second wall disengaged from the first wall, wherein the coupling means comprises a first locking member slidably mounted to the first wall, and a claw disposed on the cover configured to engage with the first locking member; and
a second locking member slidably mounted to the third wall configured to fix the second wall to the first wall and prevent the second wall from being detached from the first wall.

* * * * *